(12) United States Patent
Werner

(10) Patent No.: US 9,086,823 B2
(45) Date of Patent: **\*Jul. 21, 2015**

(54) PROVIDING ADAPTIVE FREQUENCY CONTROL FOR A PROCESSOR USING UTILIZATION INFORMATION

(71) Applicant: Intel Corporation, Santa Clara, CA (US)

(72) Inventor: James B. Werner, Steilacoom, WA (US)

(73) Assignee: Intel Corporation, Santa Clara, CA (US)

(\*) Notice: Subject to any disclaimer, the term of this patent is extended or adjusted under 35 U.S.C. 154(b) by 0 days.

This patent is subject to a terminal disclaimer.

(21) Appl. No.: 13/951,625

(22) Filed: Jul. 26, 2013

(65) Prior Publication Data

US 2013/0311815 A1 Nov. 21, 2013

Related U.S. Application Data

(63) Continuation of application No. 12/545,937, filed on Aug. 24, 2009, now Pat. No. 8,527,796.

(51) Int. Cl.
*G06F 1/00* (2006.01)
*G06F 1/32* (2006.01)
*G06F 1/08* (2006.01)

(52) U.S. Cl.
CPC ............... *G06F 1/08* (2013.01); *G06F 1/3203* (2013.01); *G06F 1/324* (2013.01); *Y02B 60/1217* (2013.01)

(58) Field of Classification Search
CPC .............. G06F 1/26; G06F 1/30; G06F 1/14
USPC .................... 713/300–340, 500–502
See application file for complete search history.

(56) References Cited

U.S. PATENT DOCUMENTS

| | | | |
|---|---|---|---|
| 5,590,342 A | 12/1996 | Marisetty | |
| 6,480,966 B1 | 11/2002 | Rawson | |
| 6,711,447 B1 | 3/2004 | Saeed | |
| 6,711,526 B2 | 3/2004 | Cooper | |
| 6,829,713 B2 | 12/2004 | Cooper et al. | |
| 7,146,514 B2 | 12/2006 | Kaushik et al. | |
| 7,770,034 B2 | 8/2010 | Nanja | |
| 7,861,102 B1 | 12/2010 | Ranganathan et al. | |
| 7,925,901 B2 | 4/2011 | Felter et al. | |
| 8,020,020 B2 | 9/2011 | Serebrin | |
| 8,527,796 B2 \* | 9/2013 | Werner | 713/322 |
| 2002/0007463 A1 | 1/2002 | Fung | |
| 2004/0168170 A1 | 8/2004 | Miller | |
| 2004/0216113 A1 | 10/2004 | Armstrong et al. | |
| 2005/0034002 A1 | 2/2005 | Flautner | |

(Continued)

OTHER PUBLICATIONS

Intel, "Enhanced Intel SpeedStep Technology for the Intel Pentium M Processor," Mar. 2004, pp. 1-12.

*Primary Examiner* — Raymond Phan
(74) *Attorney, Agent, or Firm* — Trop, Pruner & Hu, P.C.

(57) ABSTRACT

In one embodiment, the present invention includes a method for receiving utilization data from thread units of one or more processor cores, determining an operating frequency for a core clock signal based on the utilization data, a target utilization value, and an operating mode of the processor, and generating the core clock signal based on the determined operating frequency. Other embodiments are described and claimed.

20 Claims, 3 Drawing Sheets

(56) References Cited

U.S. PATENT DOCUMENTS

| | | |
|---|---|---|
| 2005/0132238 A1 | 6/2005 | Nanja |
| 2005/0138442 A1 | 6/2005 | Keller et al. |
| 2006/0031691 A1 | 2/2006 | Bacchus et al. |
| 2008/0082844 A1 | 4/2008 | Ghiasi et al. |
| 2008/0172565 A1 | 7/2008 | Chu et al. |
| 2008/0201591 A1 | 8/2008 | Hu et al. |
| 2009/0049314 A1 | 2/2009 | Taha et al. |
| 2009/0150695 A1 | 6/2009 | Song et al. |
| 2009/0150696 A1 | 6/2009 | Song et al. |
| 2009/0172424 A1 | 7/2009 | Cai et al. |
| 2009/0199019 A1 | 8/2009 | Hongisto et al. |
| 2010/0031266 A1 | 2/2010 | Raspl et al. |
| 2010/0037038 A1 | 2/2010 | Bieswanger et al. |
| 2010/0146316 A1 | 6/2010 | Carter et al. |
| 2010/0191936 A1 | 7/2010 | Khatri et al. |
| 2010/0218029 A1 | 8/2010 | Floyd et al. |
| 2010/0332856 A1 | 12/2010 | Song |
| 2011/0197195 A1 | 8/2011 | Cai et al. |

\* cited by examiner

PROVIDING ADAPTIVE FREQUENCY CONTROL FOR A PROCESSOR USING UTILIZATION INFORMATION

This application is a continuation of U.S. patent application Ser. No. 12/545,937, filed Aug. 24, 2009, the content of which is hereby incorporated by reference.

BACKGROUND

In modern processors, power consumption is in direction proportion to the frequency at which a processor (or core) operates. Reducing consumption thus can be achieved by reducing core frequency such that frequency control provides a means to control processor power consumption. However, that reduction unconditionally applied would result in degraded system performance.

In contrast, when a processor (or core) runs at a fixed frequency, it uses more power than necessary while running at reduced loads, where its utilization is less than 100%. Thus many systems provide some type of frequency control. Typically, frequency control is done using an operating system (OS) mechanism such as an Advanced Configuration and Power Interface (ACPI)-based mechanism. However, there are drawbacks to this approach, including the latency needed to monitor the processor and change frequency, as well as the coarse manner in which it is performed.

DETAILED DESCRIPTION

In various embodiments, adaptive frequency control may be provided to enable a processor to operate at an appropriate operating point. Furthermore, in many embodiments this control may be performed in processor hardware, avoiding the need for communication with the OS. Still further, by avoiding interaction with the OS, a finer-grained control may be realized and latencies associated with controlling processor frequency can be reduced. In some embodiments, a threshold utilization value may be set (and which can be dynamically controlled, either under processor control or user control) corresponding to a predetermined processor utilization rate, which may be used in determining operating frequency. In general, a fully utilized system (100% utilization rate) operates in a more efficient region than a lightly utilized one, such that reducing a system's operating frequency will increase its utilization, but degrade its performance. Thus embodiments seek to reduce idle time to as low as possible so that the processor will intrinsically operate at a more efficient electrical area. Frequency can be reduced with minimal performance degradation until utilization reaches 100%, at which point performance degradation begins and increases should frequency reduction continue. Thus in various embodiments, an operating frequency may be determined that positions the utilization rate at a target utilization rate of between 90% and 95%, and in some embodiments close to 100%, although the scope of the present invention is not limited in this regard.

Based on this utilization rate and various data (as will be discussed further below), a power control unit can periodically calculate the current processor utilization and update its operating frequency accordingly. This frequency control mechanism may have minimal effect on performance.

Figure 1:
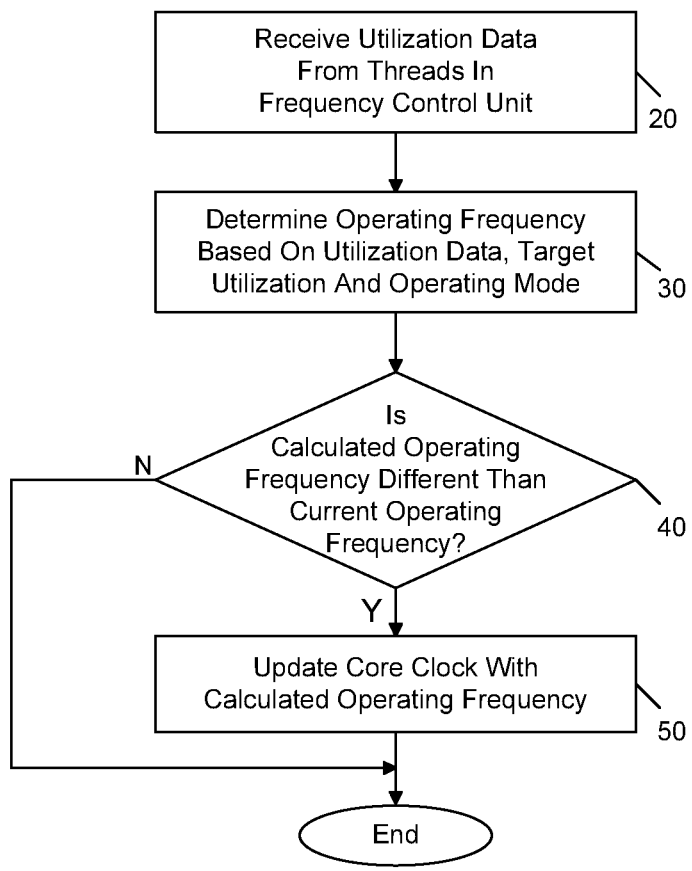
FIG. 1 is a flow diagram of a method in accordance with one embodiment of the present invention.

Referring now to FIG. 1, shown is a flow diagram of a method in accordance with one embodiment of the present invention. As shown in FIG. 1, method 10 may be used, e.g., by a power control unit (PCU), and more particularly a frequency controller of such a unit, or another logic of a processor to perform adaptive frequency control in accordance with an embodiment of the present invention. In one embodiment, the PCU is a non-software visible processor that may control the frequency and/or voltage of the package. As shown in FIG. 1, method 10 may begin by receiving utilization data from various threads (block 20). In one implementation, this utilization data may include a counter value for an active state of each thread as well as a free running counter value for each thread. Note that the utilization data obtained may be from all active threads in a processor. In other implementations different utilization data such as obtained from other counters, e.g., of instruction completions, memory writes, memory reads, cache hits and cache misses, may be provided.

Referring still to FIG. 1, next an operating frequency may be determined based at least in part on this utilization data, along with a target utilization rate and an operating mode (block 30). The mode may correspond to a given power state as in some low power states certain counters may be halted, such that timing adjustments may be taken into account when determining utilization rates. In one embodiment, the determination may be in accordance with various equations described below. After determining the operating frequency, it may be determined whether this calculated operating frequency differs from the current operating frequency (diamond 40). If not, method 10 may conclude. Otherwise, a core clock provided to the various cores may be updated using the calculated operating frequency (block 50).

In one embodiment, the core clock may be generated based on a system clock received in the frequency controller. As an example, a frequency multiplier may act to generate the core clock from the system clock. After any updates to the operating frequency, method 10 may conclude. Note that method 10 may be performed iteratively and dynamically during processor operation. In various embodiments, method 10 may be implemented in hardware using a PCU or other such logic. However, in other embodiments, method 10 may be initiated by a system management interrupt (SMI) and accordingly in such an embodiment, method 10 may be implemented in system management mode (SMM) code in a manner independent from the OS. While shown with this particular implementation in the embodiment of FIG. 1, the scope of the present invention is not limited in this regard.

Figure 2:
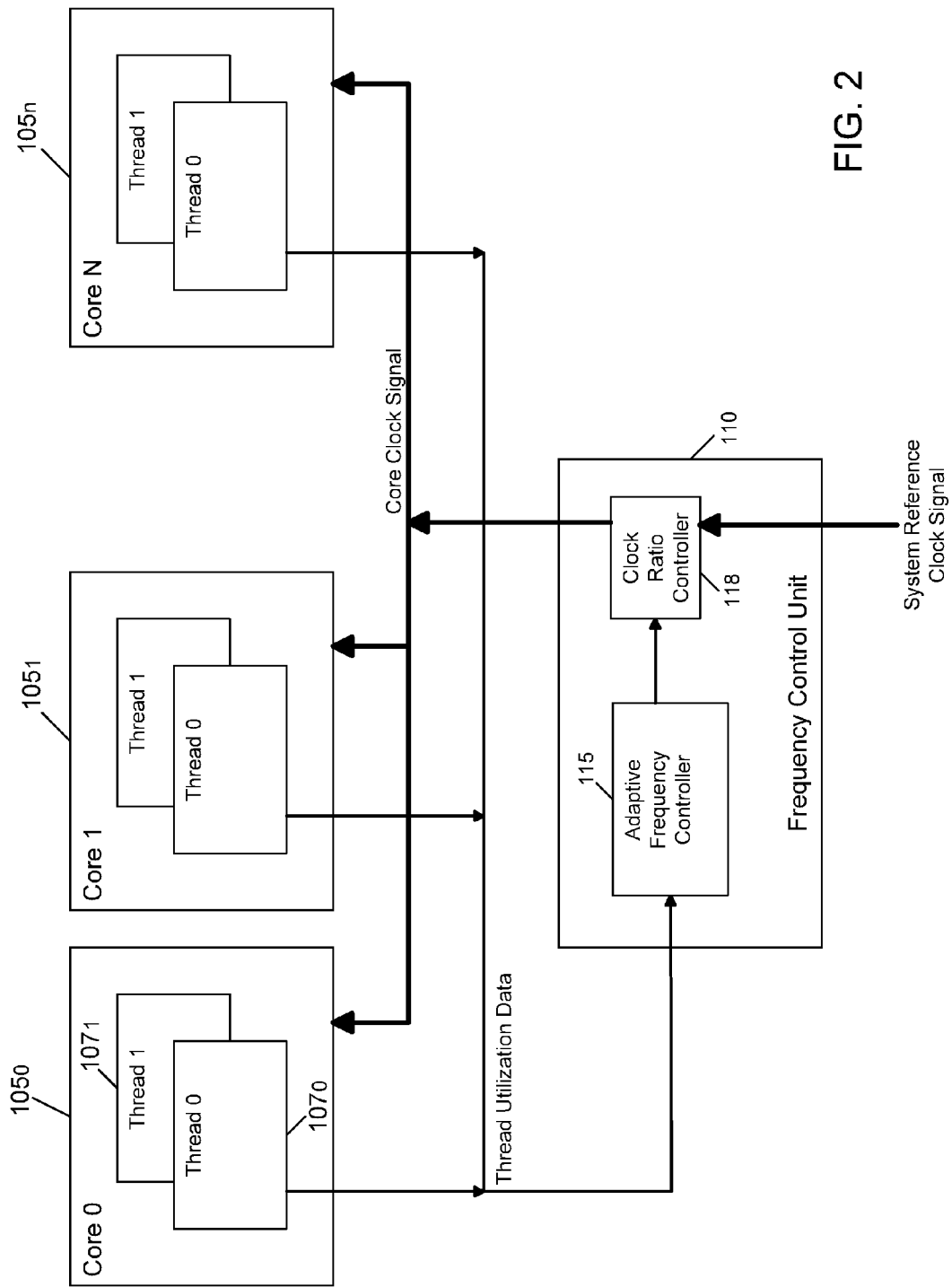
FIG. 2 is a block diagram of a portion of a processor in accordance with one embodiment of the present invention.

Referring now to FIG. 2, shown is a block diagram of a portion of a processor in accordance with one embodiment of the present invention. As shown in FIG. 2, processor 100 may be a processor package including a plurality of cores $105_0$-$105_n$ adapted on a single semiconductor die. As seen, each core 105 may be coupled to a frequency control unit 110 (e.g., of a PCU). In various implementations, control unit 110 may be dedicated logic of a processor such as a controller or other dedicated processor to perform frequency control. While not shown for ease of illustration in FIG. 2, understand that a processor package may include many other components such as integrated memory controllers, cache memories and other such logic.

As shown in FIG. 2, each core 105 may have support to handle multiple threads. In the implementation shown in FIG. 2, each core 105 includes first and second thread storage units 107. Each such thread storage unit may include a register file and various control and status registers such that each thread storage unit 107 provides a complete architectural state for a given thread running on the core. Accordingly, each thread storage unit 107 may be referred to synonymously as a "thread unit," "hardware thread," or a "logical processor." As used herein, these terms may refer to a unit that provides storage in a processor for the architectural state (e.g., a register file and associated configuration and status registers) associated with a process. Understand that while not shown for ease of illustration in FIG. 2, each core may further include various front end units, execution units and back end units in which the information of thread storages 107 may be operated on. Thus, the hardware threads may have individual state storages, but share common execution resources of the core. In one implementation there may be two thread units in each core, and 8 cores in a processor package.

As further seen in FIG. 2, frequency control unit 110 may include an adaptive frequency controller 115 that is coupled to receive thread utilization data from each of the threads of the cores (e.g., from a performance monitoring unit of each core) and a clock ratio controller 118, which receives, in one embodiment, a ratio value corresponding to a calculated operating frequency from controller 115 and generates a frequency for a core clock signal, which in turn is generated from a system reference clock signal. In one embodiment, clock ratio controller 118 may include a frequency multiplier to multiply this system reference clock signal based on the received ratio to thus output the core clock signal at the calculated operating frequency. While shown with this particular implementation in the embodiment of FIG. 2, the scope of the present invention is not limited in this regard.

Note that a processor under operational loads will enter and exit its idle state many times per second. During those idle periods, core frequency can be reduced to its minimum without degrading system performance. In one embodiment, idle periods can be statistically implied by sampling processor counters. These counters may include, in one embodiment, a time stamp counter (TSC), which is a free running counter than runs at a maximum (non-turbo) core frequency, and a C0 maximum counter (C0MCnt), which runs at the TSC frequency, but only during non-halted processor states (e.g., a C0 state of an ACPI scheme). The ratio of these two counters (C0MCnt/TSC) provides a utilization value to provide a measure of the busy (i.e., not idle) time versus the total time.

As the core clock is reduced, any given instruction stream will take longer to execute. That will leave less idle time during each sample period. Idle time can thus be reduced with no system degradation. Core frequency could effectively be reduced until idle time is 0%. However, in a system with dynamic loading, that would cause degradation.

Frequency controller 115 may calculate a current utilization by sampling the above-described counters. The calculated utilization can be compared to a target utilization, and then, based on the current core ratio, a new core ratio is calculated. To track dynamic load conditions, these above values may be periodically recalculated. Although the scope of the present invention is not limited in this regard, the period may be as small as possible, and can be between approximately 1 millisecond (ms) and 20 ms, in some embodiments.

For any given set of tasks, performance is in inverse proportion to system utilization, such that as performance increases, utilization decreases. Being that core frequency and performance are in direct proportion, core frequency and utilization are in inverse proportion. Thus for any given sample period, the relationship between core frequency and utilization can be expressed as the inverse proportion:

$$R_1 * U_1 = R_2 * U_2$$

where $R_1$ is the ratio between core clock and system clock ("ratio") for a first sample period, $U_1$ is the utilization rate ("utilization") at that ratio for the first sample period, and $R_2$ and $U_2$ are the ratio and utilization for a second sample period. The current sample period and a target period can represent the first and second sample periods, respectively. In general, the core frequency is a predetermined multiple of the system clock, so the ratio can be substituted. Substituting target ratio for $R_1$, target utilization ($U_T$) for $T_1$, current ratio ($R_C$) for $R_2$, and current utilization ($U_C$) for $U_2$, the expression becomes:

$$U_T * R_T = U_C * R_C$$

Then, solving for the target ratio leads to:

$$R_T = U_C * R_C / U_T$$

However, the slope of this expression is fixed at 1, in that a 10% increase in current utilization will cause a 10% increase in target ratio. In some embodiments, slope can be added as a variable, such that the offset between target utilization and current utilization can be modified (and in one embodiment, two slope values are provided to be used with positive and negative ($U_T - U_C$) values). In one embodiment, target utilization is a constant that can be adjusted. That adjustment is a function of the offset between target and current utilization, and results in an adjusted target utilization ($U_{TA}$). Then:

$$U_{TA} = U_T + K * (U_T - U_C).$$

Since the original function has a slope of 1, function K is slope minus 1. So then:

$$U_{TA} = U_T + (S-1) * (U_T - U_C).$$

Setting slope equal to one makes $(S-1)*(U_T - U_C) = 0$, and $U_{TA} = U_T$, which returns the original equation. Substituting $U_{TA}$ for $U_T$ and reducing leads to:

$$R_T = U_C * R_C / U_T + (S-1) * (U_T - U_C)$$

$$U_C * R_C / U_T + S U_T - S U_C - U_T + U_C$$

$$U_C * R_C / S U_T - S U_C + U_C$$

$$R_T = U_C * R_C / (U_C + S(U_T - U_C)).$$

The target ratio calculation is now adjusted for slope. In various implementations, the slope can be determined by running standard benchmarks at the maximum and minimum ratios, and may have a value of between approximately two and three in some embodiments.

With reference back to FIG. 2, each thread unit 107 periodically writes its utilization data to frequency control unit 110. In other embodiments, frequency control unit 110 or its firmware can read each threads' values. Adaptive frequency controller 115 may then calculate each thread's utilization value based on the data. As described above in one embodiment, the calculation for the current utilization value may be realized by dividing C0 max count by the TSC count, i.e., the active time divided by the total time, as follows:

$$U_C = (C0MCnt)/(TSC)$$

where TSC is the value of the free running counter and C0 MCnt is the value of the active clock cycle counter.

Because there are multiple threads in a package and frequency may be controlled as a package variable, a single frequency can be calculated based on all the inputs. Using the utilization rates from each of the threads, adaptive frequency controller 115 may determine a package utilization value. As such, ratio is a package level variable while the current utilization is at the thread level. Accordingly, thread level utilizations can be converted into a package level utilization through a statistical technique. In different embodiments, different utilization conversion techniques may include: a highest thread technique, where the thread with highest utilization determines the package ratio; a flat average technique where each thread contributes equally to the package ratio; a linear weighted average, in which each thread's contribution is reduced by its utilization; and an exponentially weighted average, in which each thread's contribution is reduced by the square of its utilization. In one embodiment, the exponential weighting may be defined according to:

$$C0MCnt = C0MCnt \times Uc^2$$

$$TSC = TSC \times Uc^2.$$

To calculate an average package utilization, the sum of the threads' C0 MCnt values is divided by the sum of the threads' TSC values (10 threads will be used in example below). When these values are used in their raw form, the average is a flat average as follows:

$$(C0MCnt0 + C0MCnt1 + \ldots + C0MCnt9)/(TSC0 + TSC1 + \ldots + TSC9).$$

Weighting prevents threads with lower utilizations from degrading the performance of higher utilized threads by reducing the effect of the lower utilized threads on the higher threads. To linear weight the average, each threads' C0 MCnt and TSC values are multiplied by that threads' utilization (C0 MCnt/TSC). The linear weighted package average is then:

$$((C0MCnt02/TSC0) + \ldots + (C0MCnt92/TSC9))/(C0MCnt0 + \ldots + C0MCnt9).$$

An exponentially weighted average is formed by multiplying C0 MCnt and TSC values by the utilization squared:

$$((C0MCnt03/TSC02) + \ldots + (C0MCnt93/TSC92))/((C0MCnt03/TSC02) + \ldots + (C0MCnt93/TSC92)).$$

As an example, a thread with C0 MCnt of 10 and TSC of 100 has a utilization of 0.10 (10%). Likewise, a C0 MCnt of 90 and TSC of 100 leads to a utilization of 0.90 (90%). A package then of 10 threads, 9 at 10% and 1 at 90%, has a flat average of 18%. The linear weighted average is 50%, while an exponential weighted average is 82%. These different averages are shown in Table 1.

TABLE 1

Flat $$\frac{10+10+10+10+10+10+10+10+10+90}{100+100+100+100+100+100+100+100+100+100} = \frac{180}{1000} = 18\%$$

Linear $$\frac{1+1+1+1+1+1+1+1+1+81}{10+10+10+10+10+10+10+10+10+90} = \frac{90}{180} = 50\%$$

Exponential $$\frac{.1+.1+.1+.1+.1+.1+.1+.1+.1+72.9}{1+1+1+1+1+1+1+1+1+81} = \frac{73.8}{90} = 82\%$$

An example with thread utilizations of 10%, 20%, 30%, 40%, 50%, 60%, 70%, 80%, 90%, and 100% is shown below in Table 2.

TABLE 2

Flat $$\frac{10+20+30+40+50+60+70+80+90+100}{100+100+100+100+100+100+100+100+100+100} = \frac{550}{1000} = 55\%$$

Linear $$\frac{1+4+9+16+25+36+49+64+81+100}{10+20+30+40+50+60+70+80+90+100} = \frac{385}{550} = 70\%$$

Exponential $$\frac{.1+.8+2.7+6.4+12.5+19.6+34.3+51.2+72.9+100}{1+4+9+16+25+36+49+64+81+100} = \frac{300.5}{385} = 78\%$$

In one embodiment, controller 115 may implement a proportional control algorithm, using operating frequency as a control variable and using a predetermined utilization rate, e.g., a utilization percentage for a control set point. No integral or derivative component is needed.

Embodiments can be implemented in different manners. For example, in some embodiments a hardware-based approach may be used such as shown in FIG. 2, where a logic unit of a processor, e.g., a dedicated logic unit such as a frequency control unit receives or obtains thread utilization data at a periodic interval and updates the operating frequency of the core clock signal based on this information. In other implementations, a combination between such hardware and software may be realized. For example, one combined approach may be to provide an OS independent mechanism, e.g., by way of a SMM realized by implementing a SMI signal to periodically cause the core clock signal frequency to be updated on a regular basis.

While the scope of the present invention is not limited in this regard, various implementations may update the core clock signal frequency on a periodic interval that can be particularly fine grained. For example, using a hardware controlled approach such as shown in FIG. 2, the core clock signal frequency may be updated approximately every one millisecond (ms). In contrast, available frequency control such as by way of an OS implementing ACPI states may update at a much slower rate, e.g., approximately every 500 ms.

Figure 3:
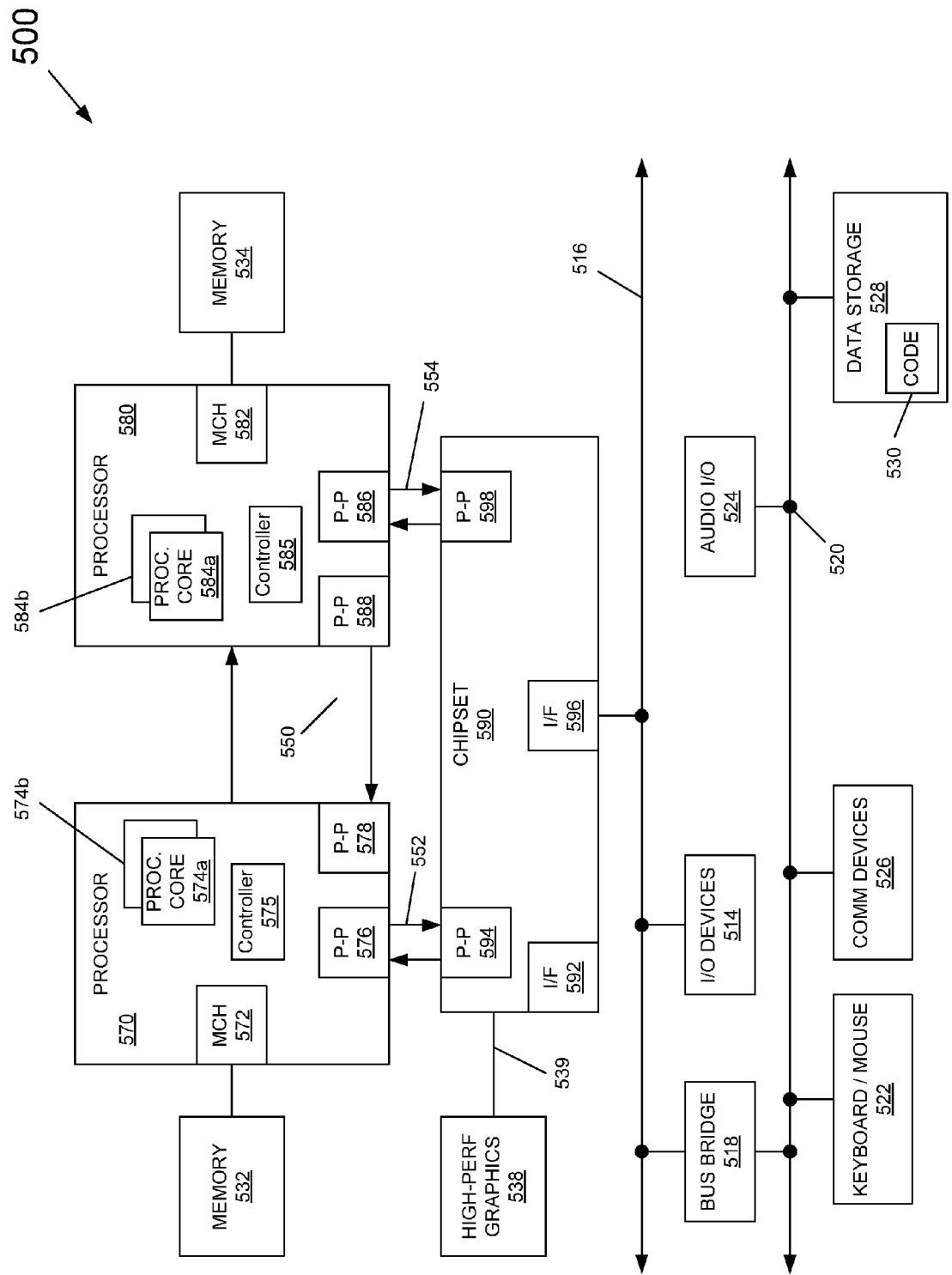
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574a and 574b and processor cores 584a and 584b), although potentially many more cores may be present in the processors. The processor cores may execute various threads and may provide utilization data to a controller 575 and 585 (e.g., a power control unit), respectively, to perform adaptive frequency control in accordance with an embodiment of the present invention.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 3, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 3, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 3, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a core having at least first and second thread storage units each including a first counter to provide a first count value and a second counter to provide a second count value, wherein the first counter and the second counter are to run at a first core clock frequency, the first count value corresponding to a number of total clock cycles and the second count value corresponding to a number of active clock cycles; and
    a power controller coupled to the at least first and second thread storage units to receive the first and second count values and to calculate a utilization value for each of the first and second thread storage units based thereon, and to determine a ratio used to set a core clock frequency based at least in part on the utilization values, a target utilization value, and a current ratio.

2. The processor of claim 1, further comprising a core clock generator to receive the ratio and a reference clock and to generate a core clock at the core clock frequency and to provide the core clock to a plurality of cores each including the at least first and second thread units.

3. The processor of claim 2, wherein the core clock generator includes a frequency multiplier to receive the reference clock and the ratio and generate the core clock therefrom.

4. The processor of claim 1, wherein the power controller is to calculate the utilization value based on the first and second count values.

5. The processor of claim 1, wherein the target utilization value is to be dynamically controlled.

6. The processor of claim 1, wherein the target utilization value is at least 90%.

7. The processor of claim 1, wherein the processor is to enter a system management mode responsive to a system management interrupt, and wherein the power controller is to determine the ratio in the system management mode.

8. The processor of claim 1, wherein the core further includes:
    one or more front end units;
    one or more execution units; and
    one or more back end units.

9. The processor of claim 4, wherein the power controller is to receive the first and second count values from the at least first and second thread storage units of a plurality of cores and to calculate the utilization value for each thread storage unit of each core.

10. The processor of claim 5, wherein an operating system (OS) is to dynamically control the target utilization value.

11. The processor of claim 8, wherein a first thread associated with the first thread storage unit and a second thread associated with the second thread storage unit are to share at least one of the one or more execution units.

12. The processor of claim 9, wherein the power controller is to determine the ratio based on less than all of the calculated utilization values.

13. The processor of claim 9, wherein the power controller is to determine the ratio based on an exponentially weighted value for each of the calculated utilization values.

14. A machine-readable medium having stored thereon instructions, which if performed by a machine cause the machine to perform a method comprising:
    receiving utilization data from at least a first thread storage unit of a first core and a second thread storage unit of a second core, the first and second cores of a processor;
    determining an operating frequency for a core clock signal based on the utilization data, a target utilization value corresponding to a threshold utilization value, and an operating mode of the processor; and
    generating the core clock signal based on the determined operating frequency and providing the core clock signal to the first core and the second core.

15. The machine-readable medium of claim 14, wherein the utilization data comprises a first count value corresponding to a number of total clock cycles and a second count value corresponding to a number of active clock cycles.

16. The machine-readable medium of claim 14, wherein the method further comprises receiving the utilization data from a plurality of cores of the processor, and determining the operating frequency based on the utilization data from the plurality of cores.

17. The machine-readable medium of claim 16, wherein determining the operating frequency includes performing a weighting of the utilization data from the plurality of cores.

18. A system comprising:
    a processor including:
        a plurality of cores, at least some of the plurality of cores having:
            one or more front end units, one or more execution units, and one or more back end units;
            a plurality of thread units each to store an architectural state for a corresponding thread and including a first counter and a second counter, the first counter to output a first count value and the second counter to output a second count value; and a logic coupled to the plurality of cores to receive the first and second count values and to calculate a utilization value for the plurality of thread units of the plurality of cores based thereon, and to determine a ratio used to set a core clock frequency based on the utilization values, a target utilization value for the processor, and a current ratio of the processor; and a dynamic random access memory (DRAM) coupled to the processor.

19. The system of claim 18, wherein the processor further comprises a clock controller coupled to the logic to receive the ratio and a reference clock and to generate a core clock at the core clock frequency and to provide the core clock to the plurality of cores.

20. The system of claim 19, wherein the logic is to determine the ratio according to: UC*RC/(UC+S(UT−UC)), where UC is a current utilization value calculated from the utilization value for the plurality of thread units, RC is the current ratio, UT is the target utilization value, and S is a slope value.

\* \* \* \* \*